United States Patent
Benedikt et al.

(10) Patent No.: US 6,202,063 B1
(45) Date of Patent: Mar. 13, 2001

(54) METHODS AND APPARATUS FOR GENERATING AND USING SAFE CONSTRAINT QUERIES

(75) Inventors: Michael Abraham Benedikt, Chicago, IL (US); Leonid Libkin, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/322,660

(22) Filed: May 28, 1999

(51) Int. Cl.[7] ........................................... G06F 17/30
(52) U.S. Cl. ................. 707/3; 707/2; 707/4; 707/103; 707/104; 707/531
(58) Field of Search .................... 707/531, 103, 707/104, 4, 3, 2

(56) References Cited

U.S. PATENT DOCUMENTS

| | | | |
|---|---|---|---|
| 5,197,005 | * | 3/1993 | Shwartz et al. ........................ 707/3 |
| 5,598,559 | * | 1/1997 | Chaudhuri ............................. 707/2 |
| 5,614,927 | * | 3/1997 | Gifford et al. ....................... 707/531 |
| 5,706,494 | * | 1/1998 | Cochrane et al. ...................... 707/2 |
| 5,761,493 | * | 6/1998 | Blakeley et al. ...................... 707/4 |
| 5,799,312 | * | 8/1998 | Rigoutsos ............................ 707/103 |
| 5,826,077 | * | 10/1998 | Blakeley et al. ...................... 707/4 |
| 5,870,755 | * | 2/1999 | Stevens et al. ...................... 707/104 |
| 5,873,075 | * | 2/1999 | Cochrane et al. ...................... 707/2 |
| 5,978,797 | * | 11/1999 | Yianilos ............................... 707/3 |

OTHER PUBLICATIONS

P. C. Kanellakis et al., "Constraint Query Languages," ACM, pp. 299–313, 1990.

A. Avron et al., "On First Order Database Query Languages," Symposium on Logic in Computer Science (LICS), IEEE Press, pp. 226–231, 1991.

M.E.–Molano et al., "Safety and Translation of Calculus Queries with Scalar Functions," ACM, pp. 253–264, 1993.

A. K. Ailamazyan et al., "Reduction of a Relational Model with Infinite Domains to the Finite–Domain Case," Soviet Physics Doklady, vol. 31, pp. 11–13, Jan. 1986.

P. Z. Revesz, "Safety Query Languages for Constraint Databases," ACM Transactions on Database Systems, vol. 23, No. 1, pp 58–99, Mar. 1998.

* cited by examiner

*Primary Examiner*—Hosain T. Alam
*Assistant Examiner*—Jean M. Corrielus
(74) *Attorney, Agent, or Firm*—Ryan, Mason & Lewis, LLP

(57) ABSTRACT

Methods and apparatus are provided for ensuring that queries presented to a database are safe thus providing solutions to both undecidability and lack of effective syntax issues. In a one aspect of the invention, a method for use in a database system includes obtaining an original query entered by a user. The invention then provides for pre-processing the query before submittal to a database engine associated with the database system wherein a result of the pre-processing operation is to ensure that a query provided to the engine is safe. Safety has a different meaning depending on the application. For example, safety may include ensuring that a query will return an output with finite results or it may include ensuring that certain geometric properties in the query are preserved in the output.

9 Claims, 6 Drawing Sheets

FIG. 2

210 — User enters Query 'Unsafe 1' into interface, WHERE Unsafe is

"SELECT X1=R.X,
        X2=POINTS1.Value,
        X3=POINTS2.Value
FROM R, POINTS POINTS1, POINTS POINTS2
WHERE X1*(X2-1)=X3"

220 — Pre-processor analyzes Unsafe1 and produces query 'Safe2' by adding restriction "SELECT X1=R.X,
        X2=POINTS1.Value,
        X3=POINTS2.Value
FROM R, POINTS POINTS1, POINTS POINTS2
WHERE X1*(X2-1)=X3
    AND NOT EXISTS
        (SELECT Value1=P1.Value, Value2=P2.Value
         FROM POINTS P1, POINTS P2
         WHERE Value1 = 1 AND Value2=0)"

230 — User queries database with Safe2 via User Interface

FROM FIG.3A

User queries database repeatedly with Safe1, by sending Safe1 back to the database engine via the user interface. User Interface gives response back from database engine.
 E.g.:

POINTS Table

Value
25
9     => Safe1 returns: X1=5 Y=0
4                           X1=3 Y=1
1                           X1=3 Y=0
0

User inputs query SafeRelational, which applies to schema with input table VERT, which is a finite relational table with 6 attributes:
v1xval, v1yval, v2xval, v2yval, v3xval, v3yval
SafeRelational outputs a table with 6 columns as well.

SafeRelational=

"SELECT U1=R.X,
   U2=R.X,
   V1=R3.X,
   V2=R4.X,
   W1=R5.X,
   W2=R6.X
FROM R R1, R R2, R R3, R R4, R R5, R R6, VERT
WHERE U1=VERT.v1xval+5 AND
   U2=VERT.v1yval*2 AND
   V1=VERT.v2xval+5 AND
   V2=VERT.v2yval*2 AND
   W1+VERT.v3xval+5 AND
   W2=VERT.v3yval*2"

420

Query pre-processor accepts SafeRelational1 as is, since it requires no modification to be made safe.

430

User creates schema Figure of type Region (stores triangular regions in the plane) and inputs some sample data (B)
TO FIG. 4B

METHODS AND APPARATUS FOR GENERATING AND USING SAFE CONSTRAINT QUERIES

CROSS REFERENCE TO RELATED APPLICATIONS

The present application is related to U.S. patent application respectively entitled: "Methods and Apparatus for Providing Aggregation Operations in Constraint Databases," filed concurrently herewith.

FIELD OF THE INVENTION

The invention relates to database management systems and, more particularly, to methods and apparatus for generating and using safe constraint queries in accordance with relational and spatial database management systems.

BACKGROUND OF THE INVENTION

The power of classical query languages is linked to the fact that they express a restricted class of declarative programs. The class of semantic objects expressible through queries in the relational calculus is limited in a number of helpful ways, for example, each such query is polynomial-time computable. Although relational calculus queries may not return finite results, a natural subclass of the relational calculus does, namely, the class of range-restricted queries. This class gives guarantees of finite output and is complete in that it captures all relational calculus queries whose outputs are always finite, i.e., safe queries. The class of range-restricted queries provides an effective syntax for safe queries, as every safe query is equivalent to a range-restricted one. However, the question of whether a relational calculus query is safe or not is known to be undecidable in conventional database systems.

The relational theory on which these results are based deals only with pure relational queries, that is, those containing no interpreted predicates. Practical query languages, in contrast, contain interpreted functions such as + and *. The resulting queries, then, make use of the domain semantics, rather than being independent of them as are pure relational queries. For example, if the underlying structure is the field of real numbers $\langle \Re, +, *, 0, 1, < \rangle$, the extension of relational calculus is achieved by using polynomial (in) equalities. For example, the query $\phi(x, y) \equiv \exists z \cdot R(x, z) \wedge R(z, y) \wedge x^2 + y^2 = z$ defines a subset of the self-join operation with the condition that in joinable tuples $(x, z)$ and $(z, y)$, z must be the sum of squares of x and y. A natural question, then, is what sort of restrictions still apply to queries given with interpreted structure.

A problem related to safety is that of state-safety, that is, for a query and a database, determine if the output is finite. Unlike the safety problem, which are undecidable, the state-safety problem is decidable for some domains, such as natural numbers with the order relation. However, there are interpreted structures (even with decidable first-order theory) for which this problem is undecidable and for which the class of safe queries cannot be described syntactically.

Accordingly, there is a need for methods and apparatus for generating relational calculus queries in the context of certain types of database systems that are considered safe and thus solve the issues of undecidability and the lack of effective syntax.

SUMMARY OF THE INVENTION

The present invention provides for methods and apparatus for ensuring that queries presented to a database are safe thus providing solutions to both the undecidability and lack of effective syntax issues mentioned above. In a broad aspect of the invention, a method for use in a database system includes obtaining an original query entered by a user. The invention then provides for pre-processing the query before submittal to a database engine associated with the database system wherein a result of the pre-processing operation is to ensure that a query provided to the engine is safe. As mentioned above, safety has a different meaning depending on the application. For example, safety may include ensuring that a query will return an output with finite results or it may include ensuring that certain geometric properties in the query are preserved in the output.

In a first embodiment of the invention, the pre-processing step includes automatically modifying the original query to ensure a return of finite results from the database by inserting at least one range-restriction in the original query. The range-restriction specifies an upper bound on the results to be returned by the database as a set of roots of polynomials with coefficients coming from an active domain of the database and a finite set of constants. Preferably, the range-restriction is inserted regardless of whether the original query would have returned a finite result.

In a second embodiment, the original query is a conjunctive query and the pre-processing step includes analyzing the original conjunctive query to determine if the original conjunctive query would return finite results from the database. Further, the pre-processing step includes prompting the user to restrict the original conjunctive query, if the original query would not return finite results, by inserting at least one range-restriction in the original query. Again, the range-restriction specifies an upper bound on the results to be returned by the database as a set of roots of polynomials with coefficients coming from an active domain of the database and a finite set of constants.

In a third embodiment, the original query contains at least one geometric property and the pre-processing step includes coding the original query with effective syntax to ensure preservation of the at least one geometric property in results returned from the database. Thus, whenever a query includes a certain type of geometric object, the result returned by the database engine will include only that type of geometric object.

The invention applies to the standard relational calculus with interpreted functions on finite structures; we then applied these results to get structural restrictions on the behavior of queries in the constraint database model of Kanellakis, Kuper and Revesz, "Constraint Query Languages," Journal of Computer and System sciences, 51 (1995), 26–52 (extended abstract in PODS'90, pp. 299–313). This model is motivated by new applications involving spatial and temporal data, which require storing and querying infinite collections. It extends the relational model by means of "generalized relations." These are possibly infinite sets defined by quantifier-free first-order formulae in the language of some underlying infinite structure $M = \langle U, \Omega \rangle$. Here U is a set (assumed to be infinite), and $\Omega$ is a signature that consists of a number of interpreted functions and predicates over U. For example, in spatial applications, M is usually the real field $\langle \Re, +, *, 0, 1, < \rangle$, and generalized relations describe sets in $\Re^n$.

A database given by a quantifier-free formula $\alpha(x_1, \ldots, x_n)$ in the language of $\Omega$ defines a (possibly infinite) subset of $U^n$ given by $D_\alpha = \{ \vec{\alpha} \in U^n \mid M \models \alpha(\vec{\alpha}) \}$.

Such databases are called finitely representable, as the formula $\alpha$ provides a finitary means fox representing an infinite set. For example, if $\alpha(x, y) \equiv (x^2+y^2 \leq 1)$, then $D_\alpha$ is the circle of radius 1 with the center in (0, 0).

Relational calculus can be extended in a straightforward manner to this model, by incorporating atomic formulas which are $\Omega$-constraints, that is, atomic $\Omega$-formulae. For example, $\phi(x, y) \equiv (D(x, z) \wedge y = x^2)$ is a first-order query which, on $D_\alpha$ defined above, returns the intersection of the circle with the graph of the function $y = x^2$.

For the constraint model, the invention enforces safety in the sense of the preservation of restricted geometric classes of databases within powerful constraint query languages. In particular, we deal with enforcing that polynomial constraint queries preserve linear constraint databases and subclasses thereof. Linear constraints are used to represent spatial data in many applications. Linear constraints have several advantages over polynomial: the quantifier-elimination procedure is less costly, and numerous algorithms have been developed to deal with figures represented by linear constraints. At the same time, the extension of relational calculus with linear constraints has severely limited power as a query language. Thus, it is natural to use a more powerful language, such as relational calculus with polynomial constraints, to query databases represented by linear constraints. We also consider polynomial constraints over the smaller class of convex polyhedra, the latter being an even more restricted class that still captures spatial figures that are important for geometric modeling.

Since the class of constraints used in queries is more general than the class used to define databases, we encounter the safety problem again: the output of a polynomial when applied to a linear constraint database may fail to be a linear constraint database, and similarly the output of a polynomial constraint query on a convex polyhedron may fail to be a convex polyhedron. Generally, if spatial databases are required to have certain geometric properties, then the safety problem is whether those properties are preserved by a given query language. The invention provides means for enforcing that polynomial constraint queries do preserve geometric properties, in particular for the classes of convex polytopes, convex polyhedra, and compact semi-linear sets. It also provides means to determine whether a conjunctive polynomial constraint query does preserve the classes listed above.

BRIEF DESCRIPTION OF THE DRAWINGS

FIG. 2 is a flow diagram of a method of automatic safe query translation according to an illustrative embodiment of the present invention;

FIGS. 4A and 4B is a flow diagram of a method of effective syntax query translation according to an illustrative embodiment of the present invention.

DETAILED DESCRIPTION OF PREFERRED EMBODIMENTS

The present invention is described below in the context of generation and use of safe queries in a spatial database. As is known, spatial databases store information related to spatial locations. Examples of spatial databases are computer aided design (CAD) databases (i.e., database for storing design information about how objects are constructed) and geographic databases (i.e., database for storing geographic information such as, for example, maps) referred to as Geographic Information Systems (GIS). Information associated with spatial databases is typically made up of geometric constructs (e.g., lines, triangles, polygons, etc.). It is to be appreciated that the teachings of the invention discussed herein are not limited to these specific examples but rather are also applicable to all databases having information with properties similar to geometric information, e.g., integer databases that support addition, multiplication and/or ordering operations. It is also to be noted that the invention is applicable to relational databases. As is known, a relational database is a database that stores data in the form of "relations," which may be viewed as tables of data items. An "attribute" of a relation refers to a specific category of data in a relation. The term "tuple" refers to a particular data item or record stored in a table or other type of relation. A "query" is a request for information in some form entered by a user to the database system.

Further, as used herein, the term "processor" is intended to include any processing device, including a CPU (central processing unit) and associated memory. Accordingly, software instructions or code associated with implementing the methodologies of the present invention may be stored in associated memory and, when ready to be utilized, retrieved and executed by an appropriate CPU.

Figure 1:
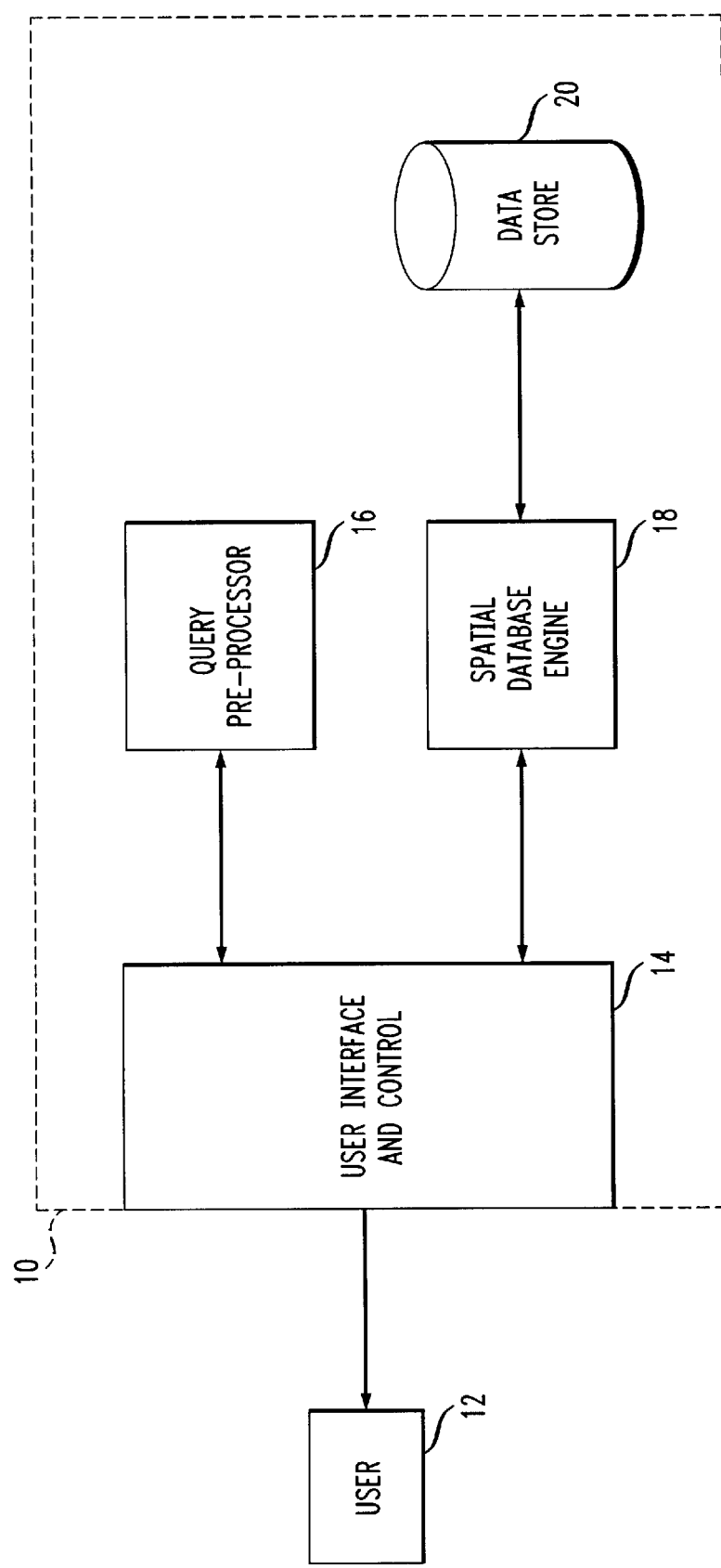
FIG. 1 is a block diagram of a relational spatial database management system according to an illustrative embodiment of the present invention.

Referring initially to FIG. 1, a block diagram of a relational spatial database management system according to an illustrative embodiment of the present invention is shown. The system 10 includes a user interface and control unit 14 with which a user 12 of the system interacts to enter queries and view results associated with the database system 10. The user interface can include any conventional computer input/output devices. For example, the user interface and control unit 14 may include a keyboard and/or mouse for entering and modifying queries and data and a video terminal for viewing query results and other data associated with the other components of the system 10.

The database system 10 also includes a query pre-processor 16 coupled to the user interface 14. As will be explained in detail below, the query pre-processor 16 performs query analysis and translation operations according to the invention. For instance, the pre-processor 16 analyzes a user input query to determine if the ranges associated with the query are restricted to ensure safety. Also, the pre-processor 16 performs transformations (i.e., translates) on a user input query to return a query that is restricted to ensure safety.

The database system 10 also includes a spatial database engine 18 coupled to the user interface 14. As will be explained in detail below, the spatial database engine 18 controls the storage of spatial information such as, for example, Point and Region data in a data store 20 coupled thereto. Also, the spatial database engine 18 processes queries received from the user interface 14.

It is to be appreciated that the components depicted in the relational spatial database management system 10 may be implemented in accordance with one or more general or special purpose processors. Depending on the amount and complexity of the spatial data, the system 10 may be embodied in a variety of processor-based machines, e.g., one or more personal computers, workstations, microcomputers, etc.

For ease of reference, the remainder of the detailed description will be divided into sections as follows: (I) Notations; (II) Data Structure Qualities; (III) Automatic Safe Query Translation; (IV) Safe Query Analysis and User-Input Query Restriction; (V) Effective Syntax Query Translation Via Preservation of Geometric Properties.

I. Notations

It is to be appreciated that new applications of database technology, such as Geographical Information Systems (GIS), have spurred a considerable amount of research into generalizations of the standard relational database model to deal with the manipulation of geometric or spatial data. One common approach to modeling spatial database is to consider input databases as given by a set of well-behaved relations in euclidean space, for example, by a set of semi-linear or semi-algebraic sets. There are a number of proposed query languages that extend classical relational algebra to this setting, languages that allow the use of various geometric operations in manipulating spatial databases. One of the most well-developed models for spatial queries is the constraint database model as disclosed in P. Kanellakis, G. Kuper, and P. Revesz, "Constraint Query Languages," *JCSS*, 51 (1995), 26–52, extended abstract in *PODS'90*, pages 299–313. In this model, spatial databases are represented as sets of linear or polynomial constraints. Databases are queried using standard relational calculus with linear or polynomial inequalities as selection criteria. These languages, denoted by FO+LIN and FO+POLY, have become the dominant ones in the constraint database literature. FO+EXP+POLY is another. These languages have a very important closure property: the application of a FO+LIN query to a linear constraint set yields a new set of linear constraints; similarly FO+POLY queries on sets definable with polynomial constraints produce sets that can still be defined with polynomial constraints.

The notations we use are fairly standard in the literature on databases. We study databases over infinite structures.

Let $M=\langle U,\Omega\rangle$ be an infinite structure, where U is an infinite set, called a carrier (in the database literature it is often called domain), and $\Omega$ is a set of interpreted functions, constants, and predicates. For example, for the real field $\langle \Re, +, *, 0,1, <\rangle$, the carrier is $\Re$ (the set of real numbers), and the signature consists of the functions + and *, constants 0 and 1, and predicate <.

A (relational) database schema SC is a nonempty collection of relation names $\{S_1, \ldots, S_l\}$ with associated arities $p_1, \ldots, p_l>0$. Given M, an instance of SC over M is a family of finite sets, $\{R_1, \ldots, R_l\}$, where $R_i \subset U^{p_i}$. That is, each schema symbol of arity $p_i$ is interpreted as a finite $p_i$-ary relation over U. Given an instance D, adom (D) denotes its active domain, that is, the set of all elements that occur in the relations in D. We normally assume adom (DB) is not empty.

As our basic query language, we consider relational calculus, or first-order logic, FO, over the underlying models and the database schema. In what follows, L (SC, $\Omega$) stands for the language that contains all symbols of SC and $\Omega$; by FO (SC, $\Omega$) we mean the class of all first-order formulae built up from the atomic SC and $\Omega$-formulae by using Boolean connectives $\vee, \wedge, \neg$ and quantifiers $\forall, \exists$ and $\forall x \in$adom, $\exists x \in$adom. When $\Omega$ is (+,−,0,1,<), (+,*,0,1, <), or (+,*,$e^x$, 0,1, <), we use the standard abbreviations FO+LIN, FO+POLY, or FO+EXP, respectively, often omitting the schema when it is understood. Regardless of whether we are in the "classical" setting, where these queries are applied to finite databases, or in the constraint query setting discussed herein, we will refer to the syntactic query languages as relational calculus with constraints $\Omega$.

The semantics are as follows. For a structure M and a SC-instance D, the notion of (M, D) $\models \phi$ is defined in a standard way for FO (SC, $\Omega$) formulae, where $\exists x \in$adom is the active-domain quantification. That is, (M, D) $\models \exists x \phi(x,\bullet)$ if for some $\alpha \in U$ we have (M, D) $\models \phi(\alpha, \bullet)$, and (M, D) $\models \exists x \in$ adom $\phi(x, \bullet)$ if for some $\alpha \in$ adom (D) we have (M, D) $\models \phi(\alpha, \bullet)$. If M is understood, we write D $\models \phi$. The output of a query $\phi(x_1, \ldots, x_n)$ on D is $\{\vec{\alpha} = (\alpha_1, \ldots, \alpha_n) \in U^n \mid D \models \phi(\vec{\alpha})\}$, and it is denoted by $\phi[D]$. For example, $\phi(x,y) = (S(x,y) \wedge y=x * x)$ is a FO+POLY query over the schema that contains one binary relation S; and $\phi[D]$ is the set of pairs in (x, y) in D where $y=x^2$.

We now say that a FO (SC, $\Omega$) query $\phi(\vec{x})$ is safe for a SC-database D if it has finitely many satisfiers for D; that is, $\phi[D]$ is finite. A query is safe if it is safe for all databases.

As previously explained, we need to distinguish a class of "well-behaved" models. We use o-minimality and quantifier-elimination, as are known in the art, for this purpose. We say that M is o-minimal, if every definable set is a finite union of points and open intervals $\{x \mid a<x<b\}$ (we assume that < is in $\Omega$). Definable sets are those of the form $\{x \mid M \models \phi(x)\}$, where $\phi$ is a first-order formula in the language of M, possibly supplemented with symbols for constants from M. We say that M admits quantifier-elimination (QE) if, for every formula $\phi(\vec{x})$, there is an equivalent quantifier-free formula $\psi(\vec{x})$ such that $M \models \forall \vec{x} \cdot \phi(\vec{x}) \leftrightarrow \psi(\vec{x})$. Below we list the most important examples of classes of interpreted structures and constraints often used in applications:

Linear Constraints: $\langle \Re, +, -, 0,1, <\rangle$ is o-minimal, has QE, and its first-order theory is decidable.

Polynomial Constraints: The real field $\langle \Re, +, *, 0,1, <\rangle$ is o-minimal, has QE, and its first-order theory is decidable. This follows from Tarski's theorem, as is known in the art.

Exponential Constraints: $\langle \Re, +, *, e^x, 0,1, <\rangle$ is o-minimal.

The following are results about o-minimal structures that will be used herein:

Fact 1.1 (Uniform Bounds)

If M is o-minimal, and $\phi(x, \vec{y})$ is a first-order formula in the language of M, possibly supplemented with symbols for constants from M, then there is an integer K such that, for each vector $\vec{\alpha}$ from M, the set $\{x \mid M \models \phi(x, \vec{\alpha})\}$ is composed of fewer than K intervals.

If only quantifiers $\forall x \in$adom and $\exists x \in$adom are used in a query, it is called an active-semantics (or active-domain) query. This is the usual semantics for databases, and it will be the one used in most of the results here. If quantification over the entire infinite universe is allowed, we speak of a natural-semantics query. Active-semantics queries admit the standard bottom-up evaluation, while for natural-semantics it is not clear a priori if they can be evaluated at all. However, in many cases one can restrict one's attention to active-semantics queries. The following result was first shown for the pure case (no interpreted structure), for linear constraints, and then for a large class of structures as follows:

Fact 1.2 (Natural-Active Collapse)

If M is o-minimal and has QE, and $\phi$ is an arbitrary FO (SC, $\Omega$) query, then there exists an equivalent FO (SC, $\Omega$) active-semantics query $\phi_{act}$. Moreover, if the first-order theory of M is decidable and QE is effective, then the translation $\phi \to \phi_{act}$ is effective.

We now define the classes of conjunctive queries (CQ), unions of conjunctive queries (UCQ) and Boolean combination of conjunctive queries (BCCQ) in the interpreted setting. CQs are built up from atomic SC formulae and arbitrary $\Omega$-formulae by using $\wedge$ and quantifiers $\exists x$ and $\exists x \in \text{adom}$. Note that we can always assume that parameters of each SC relation are variables, as $\Omega$-terms can be eliminated by using existential (active-domain) quantifiers. It is easy to see that each CQ can be represented in the form:

$$\phi(\vec{z}) = \exists \vec{x} \exists \vec{y} \in \text{adom } S_1(\vec{u}_1) \wedge \ldots S_k(\vec{u}_k) \wedge \gamma(\vec{x}, \vec{y}, \vec{z})$$

where $S_1$'s are schema relations (not necessarily distinct), $\vec{u}_i$ is a vector of variables from $\vec{x}, \vec{y}, \vec{z}$ of appropriate arity, and $\gamma$ is a $\Omega$-formula. If $\Omega = 0$ and $\vec{x} = 0$, this is the usual notion of conjunctive queries. If $\gamma$ is quantifier-free, this is another notion of conjunctive queries.

We define UCQs to be built up from atomic SC formulae and arbitrary $\Omega$-formulae by using $\wedge$, $\vee$, and quantifiers $\exists x$ and $\exists x \in \text{adom}$. Again, it is easy to see that those are precisely the queries of the form $\phi_1 \vee \ldots \vee \phi_k$ where each $\phi_i$ is a CQ. Finally, BCCQ are arbitrary Boolean combinations of CQs.

Although we could define active domain versions of conjunctive queries, the results we state here (e.g., decidability of safety) for the more general classes above will imply the corresponding results for the more restricted class of active-domain conjunctive queries.

II. Data Structure Qualities

As previously mentioned, the present invention is applicable to databases containing spatial information. In particular embodiments to be discussed below in Sections III, IV and V, the particular type of data includes geometric constructs. However, the invention finds broader application in databases having a data model or structure that exhibits certain qualities. That is, analysis and safe query translation according to the methodologies of the invention is applicable to databases having such qualities. These preferred qualities will be described below. This section further shows that what kind of interpreted structure one uses does matter, when one studies query safety. As a by-product, we show that the state-safety problem is decidable over certain structures. We study safe translations defined as follows.

Definition 2.1

We say that there is a safe translation of (active-semantics) first-order queries over M if there is a function $\phi \to \phi_{safe}$ on (active-semantics) formulae such that for every $\phi$:

(1) $\phi_{safe}$ is safe, and
(2) If $\phi$ is safe for D, then $\phi[D] = \phi_{safe}[D]$.

A translation is canonical if $\phi_{safe}[D] = 0$ whenever $\phi$ is not safe on D. A translation is recursive if the function $\phi \to \phi_{safe}$ safe is recursive.

It is known that there are domains over which safe translations do not exist. However, we restrict our attention to active-domain quantification. To this end, the following are generalized results.

Pre-processing Construction 2.1

Let M be: (i) o-minimal; (ii) based on a dense order; (iii) admit effective QE; and (iv) have a decidable theory. Then it can be proven that there exists a recursive canonical safe translation of active-semantics formulae over M.

The above construction is achieved in the following manner. Let $\alpha(x)$ be a formula defining the active domain of the output of $\phi$. Let $\Psi_0$ be the sentence: $\neg \exists x_1, x_2 ((x_1 < x_2) \wedge (\forall x \; x_1 < x < x_2 \to \alpha(x)))$ and let $\Psi$ be an equivalent active-semantics sentence, as above. We then define $\phi_{safe}$ as $\phi \wedge \Psi$. The construction then follows from the following statement: $D \vDash \Psi$ if and only if $\phi[D]$ is finite. Examples of structures satisfying the conditions of the above construction are $\langle \Re, +, -, 0, 1, < \rangle$ and $\langle \Re, +, *, 0, 1, < \rangle$.

Corollary 2.1

An immediate corollary to the above-proposition is as follows. That is, let M be as in the above proposition. Then, the state-safety problem, previously explained, over M is decidable. This is proven, as above, by demonstrating that the active-semantics sentence $\Psi$ tests if $\phi[D]$ is finite.

It is to be appreciated that safe translations, recursive or not, need not exist even when one restricts one's attention to active-semantics queries, and all predicates in the signature $\Omega$ are computable. It is to be further appreciated that in the remainder of the detailed description, we concentrate on "well-behaved" structures, typically, o-minimal ones. For computability, we often impose QE and decidability of first-order theory.

III. Automatic Safe Query Translation

In a first embodiment, the invention provides for taking an input query entered by a user and automatically translating the query into a safe query. This is accomplished in accordance with the query pre-processor 16 (FIG. 1). As will be explained and illustrated in the context of FIG. 2, the query pre-processor automatically adds restrictions or filters to the user's original query to ensure that the query is of a form that will return only finite results when provided to the spatial database engine 18. This operation is referred to herein as range-restriction. It is to be appreciated that the added restriction or restrictions may be redundant, that is, the query entered by the user may have been safe to begin with, however, by automatically adding the restrictions, the pre-processor advantageously guarantees safety.

It is to be appreciated that the following is a mathematical explanation of range-restriction according to the invention in the context of the notation described in the previous sections. An illustrative scenario will follow this explanation. It is to be further appreciated that, given such detailed explanation of the invention, one of ordinary skill in the art may generate software code for implementing such principles for execution by a query pre-processor.

Let us informally describe the concept of range-restriction for databases over interpreted structures. It can be seen as a generalization, to arbitrary structures, of the idea of finiteness dependencies. Consider a query (o (x) over a database which is a finite set S of real numbers:

$$\phi(x,y) = \exists z [S(z) \wedge (z > y) \wedge (x > 0) \wedge (x*x = z) \wedge (y + y = z)]$$

This query defines a set of pairs of reals. It is safe, as the size of its output is at most twice the size of the input. Moreover, and this is a key observation, from the query $\phi$ and any database S, one can compute an upper bound on the output $\phi[S]$: indeed, every element in adom ($\phi[S]$) is either $\sqrt{\alpha}$ or $\alpha/2$ for some element $\alpha \in S$. Equivalently, in this upper bound every element is a solution to either $x^2 = \alpha$ or $2x = \alpha$ when $\alpha$ ranges over S. That is, an upper bound on the result of a safe query is found as the set of roots of polynomials with coefficients coming from the active domain of the database and a finite set of constants.

This is essentially the idea of range-restriction: we find, for a safe query, a set of formulae defining an upper bound on the output. We are interested in how the underlying structure interacts with queries. For example, the invention provides that not only a set of range-restriction formulae exists for any query over a well-behaved structure, but also, under some conditions, it can be found effectively. Further, the invention provides that the upper bound works not only for safe queries, but for arbitrary queries, provided they are safe on a given database.

It is to be understood that an analog of the set of roots of polynomials must be found when dealing with arbitrary structures (e.g., $\langle \Re, +, *, e^x \rangle$). The solution to this is provided below by the model-theoretic notion of algebraic formulae in subsection (a). The range-restriction conversion technique is provided in subsection (b). Then, in subsection (c), we give two examples: the pure case, where our main result trivially translates into a classical relational theory result, and a much less trivial FO+POLY case, where we demonstrate that the upper bound is a set of roots of polynomials. Subsection (d) provides some extensions of the main result.

(a) Algebraic formulae over o-minimal structures

Here we consider formulae over M, that is, first-order formulae in the language $L(\Omega)$. We consider formulae $\phi(\vec{x}; \vec{y})$ with distinguished parameter variables $\vec{y}$; we use ";" to separate those variables. Assume that $\vec{x}$ is of length n and $\vec{y}$ is of length m. Such a formula (in the language $\Omega$ and constants for elements U) is called algebraic if for each $\vec{b}$ in $U^m$ there are only finitely many satisfiers of $\phi(\vec{x}; \vec{b})$; that is, the set $\{\vec{a} \in U^n \mid M \vDash \phi(\vec{x}; \vec{b})\}$ is finite. A collection of formulae is algebraic if each of its elements is algebraic.

We need a syntax for algebraic formulae that will be used in the algorithms that guarantees safety. This syntax is provided below.

Let $\Xi = \{\xi_1(x; \vec{y}), \ldots, \xi_k(x; \vec{y})\}$ be a collection of formulae. Let:

$$same_\Xi(x, x'; \vec{y}) \equiv \bigwedge_{i=1}^{k} (\xi_i(x; \vec{y}) \leftrightarrow \xi_i(x'; \vec{y}))$$

Now define:

$$\beta_{\Xi S}(x; \vec{y}) \equiv \forall x', x'' \cdot x' < x < x'' \rightarrow (\exists z x' \leq x'' \wedge \neg\ same_\Xi(x, z; \vec{y}))$$

Proposition 3.1

Let M be an o-minimal structure based on a dense order. Then a formula $\phi(x; \vec{y})$ is algebraic (over M) if and only if there exists a collection of formulae $\Xi$ such that $\phi$ is equivalent to $\beta_\Xi$-formula $\phi(\vec{x}; \vec{y})$ is algebraic if and only if there exists a collection of formulae $\Xi$ in variables $(\vec{x}; \vec{y})$ and a formula $\psi(\vec{x}; \vec{y})$ such that $\phi$ is equivalent to $\beta_\Xi(x_1; \vec{y}) \wedge \ldots \wedge \beta_\Xi(x_n; \vec{y}) \wedge \psi(\vec{x}; \vec{y})$.

The one-variable case can be proven as follows. Let $\Xi$ be a collection of formulae, and assume that $\beta_\Xi$ is not algebraic. That is, for some $\vec{b}$ over U, $\beta_\Xi(M; \vec{b}) = \{\alpha \mid M \vDash \beta_\Xi(\alpha; \vec{b})\}$ is infinite. Since M is o-minimal, $\beta_\Xi(M; \vec{b})$ is a finite union of points and intervals. Since < is dense, it means that there exist $\alpha_0 < b_0 \in U$ such that $[\alpha_0, b_0] \subseteq \beta_\Xi(M; \vec{b})$. We now consider the formulae $\xi'_i(x) = \xi_i(x; \vec{b})$ for all $\xi_i \in \Xi$. Since both $\xi_i(M)$ and $\neg \xi'_i(M)$ are finite unions of intervals and < is dense, for every non-degenerate interval I, it is the case that either $I \cap \xi'_i(M)$ or $I \cap \neg\xi'_i(M)$ contains an infinite (closed) interval. Using this, we construct a sequence of intervals as follows: $I_0 = [\alpha_0, b_0]$, $I_i \subseteq I_0$ is an interval that is contained either in $I_0 \cap \xi'_i(M)$ or in $I_0 \cap \neg\xi'_i(M)$. At the jth step, $I_j \subseteq I_{j-1}$ is an interval that is contained either in $I_{j-1} \cap \xi'_i(M)$ or in $I_{j-1} \cap \neg\xi'_i(M)$. Let $I = I_k$. Then, for any c, d $\in I$, $M \vDash \xi_i(c; \vec{b}) \leftrightarrow \xi_i(d; \vec{b})$.

Since $I = [\alpha', b'] \subseteq [\alpha_0, b_0]$ and $M \vDash \beta_\Xi(c; \vec{b})$ for all $c \in I$, we obtain that, for every $c \in [\alpha', b']$, there exists $d \in [\alpha', b']$ such that $M \vDash \neg\ same\ (c, d; \vec{b})$. That is, for some $\xi_i \in \Xi$, $M \vDash \neg (\xi_i(c; \vec{b}) \leftrightarrow \xi_i(d; \vec{b}))$, which is impossible by construction of I. This proves that $\beta_\Xi$ is algebraic.

For the converse, we let, for any $\beta(x; \vec{y})$, $\Xi$ consist of just $\beta$. That is, $\beta_\Xi(x; \vec{y})$ is:

$$\forall x', x'' \cdot x' < x < x'' \rightarrow (\exists z \cdot x' \leq z \leq x'' \wedge \neg(\beta(x; \vec{y}) \leftrightarrow \beta(z; \vec{y})))$$

We claim that $\beta$ and $\beta_\Xi$ are equivalent, if $\beta$ is algebraic. Fix any $\vec{b}$ of the same length as $\vec{y}$, and assume that $\beta(a; \vec{b})$ holds. If $\beta_\Xi(a; \vec{b})$ does not hold, then there exist $\alpha' < \alpha < \alpha''$ such that for every $c \in [\alpha', \alpha'']$, $\beta(c; \vec{b}) \leftrightarrow \beta(z; \vec{b})$ holds; thus $\beta(c; \vec{b})$ holds for infinitely many c, contradicting algebraicity of $\beta$. Hence, $\beta_\Xi(a; \vec{b})$ holds. Conversely, assume that $\beta_\Xi(a; \vec{b})$ holds. If $\beta(a; \vec{b})$ does not hold, then there is an interval containing a on which $\beta(\bullet; \vec{b})$ does not hold. Indeed, $\neg\beta(M; \vec{b})$ is a finite union of intervals, whose complement is a finite set of points, so the above observation follows from the density. We now pick $\alpha' < \alpha''$ such that $\beta(\bullet; \vec{b})$ does not hold on $[\alpha', \alpha'']$. Since $\beta_\Xi(a; \vec{b})$ holds, we find $c \in [\alpha', \alpha'']$ such that $\neg(\beta(\alpha; \vec{b}) \leftrightarrow \beta(c; \vec{b}))$ holds, that is, $\beta(c; \vec{b})$ holds for $c \in [\alpha', \alpha'']$, which is impossible. Thus, we conclude that $\beta(\alpha; \vec{b})$ holds, proving that $\beta$ and $\beta_\Xi$ are equivalent, and finishing the one variable case.

For the multi-variable case, we note that algebraicity of $\beta_\Xi$ implies that $\phi'(\vec{x}; \vec{y}) = \beta_\Xi(x_1; \vec{y}) \wedge \ldots \wedge \beta_\Xi(x_n; \vec{y}) \wedge \psi(\vec{x}; \vec{y})$ is algebraic. Conversely, let $\phi(\vec{x}; \vec{y})$ be algebraic. Consider:

$$\phi_i(x_i; \vec{y}) = \exists x_1 \ldots \exists x_{i-1} \exists x_{i+1} \ldots \exists x_n \cdot \phi(x_1, \ldots, x_i, \ldots, x_n; \vec{y})$$

Let $X(x; \vec{y})$ be $\phi_1(x; \vec{y}) \vee \ldots \vee \phi_n(x; \vec{y})$. Obviously each $\phi_i$ is algebraic, and thus $X(x; \vec{y})$ is algebraic. Hence, $X(x; \vec{y})$ is equivalent to $\beta_\Xi(x; \vec{y})$ for some finite collection $\Xi$ of formulae in $(x; \vec{y})$. Note that if $\phi(\vec{\alpha}; \vec{b})$ holds and $\alpha_i$ is the ith component of $\vec{\alpha}$, then $X(x; \vec{y})$ holds and thus $\beta_\Xi(\alpha_i; \vec{b})$ holds. This shows that $\phi$ is equivalent to $\beta_\Xi(x_i; \vec{y}) \wedge \ldots \wedge \beta_\Xi(x_n; \vec{y}) \wedge \phi(\vec{x}; \vec{y})$ thus completing the proof.

Corollary 3.1

If M is an o-minimal structure based on a dense order, and $\phi(\vec{x}; \vec{y})$ is algebraic over M, then $\phi$ is algebraic over any M' elementary equivalent to M.

This is proven in the following manner. There exists a collection of formulae $\Xi$ such that $M \vDash \forall \vec{x} \forall \vec{y} \cdot \phi(\vec{x}; \vec{y}) \leftrightarrow (\phi(\vec{x}; \vec{y}) \wedge \bigwedge_i \beta_\Xi(x_i; \vec{y}))$. Hence the same sentence is true in M'. Since M' is also o-minimal and based on a dense order, we get from the proposition that φ is algebraic in M',too.

(b) Main Pre-processing Construction

We start with a few definitions. For a L(Ω)-formulae $\gamma(\vec{x}; \vec{y})$ and database D, let:

$$\gamma(D) = \{\vec{a} | \exists \vec{b} \in adom\ (D)^{m'}\ such\ that\ D \vDash \gamma(\vec{a}; \vec{b})\}$$

If Γ is a collection of formulae in $\vec{x}$; +e,rar +ee y, define:

$$\Gamma(D) = \bigcup_{\gamma \in \Gamma} \gamma(D).$$

Note that if Γ is algebraic and finite, then Γ (D) is finite.

Definition 3.1 (Range-restriction)

Let M be an interpreted structure. A range-restricted query over M and a database schema SC is a pair Q=(Γ, φ($\vec{x}$)), where Γ is a finite collection $\{\gamma_1(\vec{x}; \vec{y}), \ldots, \gamma_m(\vec{x}; \vec{y})\}$ of algebraic L(Ω) formulae, and φ($\vec{x}$) is a L(SC, Ω) query.

The semantics of Q is as follows:

$$Q[D] = \{\vec{a} \in \Gamma(D) | D \vDash \phi(\vec{a})\}$$

That is, Γ provides an upper bound on the output of a query; within this bound, a usual first-order query is evaluated. For example, let φ(x) be the FO+POLY query S (x) ∨(x>5). Clearly, it is not safe. Let now γ(x; y)≡(x*x=y) and Q=({γ}, φ). Then, for any database S (which a finite set of the reals), Q [S] is the set of those elements α such that α² ∈ S and either α ∈ S or α>5. Clearly, this is a finite set.

It is to therefore be observed that every range-restricted query is safe.

We call a range-restricted query (Γ,φ) active-semantics if φ is an active-semantics formula. Note that Γ does not mention the database. As will be shown, range-restricted active queries characterize all the safe active-semantics queries in the following sense.

Preprocessing Construction 3.1

Let M be any o-minimal structure based on a dense linear order. Then, there is a function Make_Safe that takes as input an active-domain formula φ($\vec{x}$), and outputs a range-restricted active query Q=(Γ, ψ) with the property that Make_Safe (φ) is equivalent to φ on all databases D for which φ is safe. Furthermore, if M has effective quantifier-elimination, then Make_Safe is recursive.

This may be achieved in the following manner. We deal with the one-variable case first. Let:

$$\phi(z) = Q_1\ w_1 \in adom \ldots Q_1\ w_k \in adom.\alpha(z, \vec{w})$$

where each $Q_i$ is ∃ or ∀ and α (z, $\vec{w}$) is quantifier-free, and all atomic subformulae R (. . .) contain only variables, excluding z. Any formula can be transformed into such by adding existential quantifiers. Let $\Xi = \{\xi_i(z, \vec{w}) | i=1, \ldots, k\}$ be the collection of all Ω-atomic subformulae of α. We may assume without loss of generality that the length of $\vec{w}$ is nonzero, and that Ξ is nonempty (if this is not true for φ, take φ∧∀ w ∈adom (w=w) and transform it to the above form).

Define $same_\Xi (\alpha, b; \vec{w})$, as before, to be $\bigwedge i=1^k (\xi_i(\alpha, \vec{w}) \leftrightarrow \xi_i(b, \vec{w}))$, and define γ(x; $\vec{w}$) to be:

$$\beta_\Xi(x; \vec{w});\ that\ is,\ \gamma(x; \vec{w}) \equiv \forall x', x'' \cdot x' < x < x'' \rightarrow \exists y \cdot [x' \leq y \leq x'']$$
$$\wedge \neg same_\Xi (x, z; \vec{w})]$$

Now Γ consists just of γ, with $\vec{w}$ being distinguished parameters. We let Make_Safe (φ) output ({γ}, φ).

Since γ is algebraic by proposition 3.1, we must show that $\{\alpha\ |DB \vDash \phi(\alpha)\} = \{\alpha \in \Gamma\ (DB)\ |\ DB \vDash \phi(\alpha)\}$ for every nonempty database for which φ is safe.

Assume otherwise; that is, for some nonempty D for which φ is safe, we have DB ⊨φ(α) but α ∉ Γ (D). Let $\vec{c}_1, \ldots, \vec{c}_M$ be an enumeration of all vectors of the length of $\vec{w}$ of elements of the active domain. Note that M>0. Since α ∉ Γ (D), we have that for each i=1, . . . M, there exist $\alpha_i, \alpha'_i$ such that $\alpha_i < \alpha < \alpha'_i$ and M ⊨$same_\Xi(\alpha, c; \vec{c}_i)$ for all c∈[$\alpha_i, \alpha'_i$].

Let b=max{$\alpha_i$}, b'=max{$\alpha_i$}. We have b<α<b', and for each $\vec{c}$ (of length of $\vec{w}$) over the active domain, we have $\xi_i$ (α, $\vec{c}$)↔$\xi_i$ (c, $\vec{c}$) for every c ∈ [b, b']. From this, by a simple induction on the structure of the formula (using the fact that z does not appear in any atomic formula R (. . .)), we obtain that D ⊨ α(α, $\vec{c}$)↔α(c, $\vec{c}$) for every $\vec{c}$ over adom (D) and every c ∈ [b, b'], and thus D ⊨ φ(α)↔φ(c), which implies that φ is not safe for D. This contradiction proves correctness of Make_Safe for the one-variable case. This completes the proof for the one-variable case. We handle the multivariable case by reducing to the one-variable case.

Let M'=⟨U, Ω'⟩ be a definable extension of M that has quantifier-elimination. Note that M' is o-minimal. Let φ($z_1, \ldots, z_n$) be given, and define:

$$\phi_i(z_i) \equiv \exists z_1 \ldots \exists z_{i-1} \exists z_{i+1} \ldots \exists z_n \cdot \phi(z_1, \ldots, z_{i-1}, z_{i+1}, \ldots, z_n).$$

There is a L (SC, Ω') active formula $\psi_1(z_i)$ such that D ⊨ ∀z·$\psi_i(z) \leftrightarrow \phi_i(z)$ for all D. Let ($\{\gamma_i(z_i, \vec{w}_i)\}, \psi_i(z_i)$) be the output of Make_Safe on $\psi_i$. Since M" is a definable extension, we can assume without loss that $\gamma_i$ is a Ω-formula.

We now define:

$$\gamma(\vec{z}; \vec{w}_1, \ldots, \vec{w}_n) \equiv \gamma_1(z_1; \vec{w}_1) \wedge \gamma_n(z_n; \vec{w}_n),$$

where each $\vec{w}_i$ is of the same length as the vector of distinguished parameters in the formulae $\gamma_i$. Finally, Make_Safe (φ) outputs ({γ},φ). To see that it works, first notice that algebraicity of all $\gamma_i$ s implies algebraicity of γ. Now assume that D ⊨ φ($\vec{\alpha}$) where $\vec{\alpha} = (\alpha_1, \ldots, \alpha_n)$. Then D ⊨ $\phi_i(\alpha_i)$, and thus for some vector $\vec{c}$ of elements of the active domain, we have that $\gamma_i(\alpha_i, +e,rar\ +ee_i)$ holds. Thus, if $\vec{c}$ is the concatenation of all $\vec{c}_i$s, then $\gamma(\vec{\alpha}, \vec{c})$ holds, showing that $\vec{\alpha} \in \Gamma(D)$, where Γ={γ}. This completes the proof of the multivariable case.

We finally notice that Make_Safe for one-variable formulae is recursive, no matter what M is. For the multivariable case, to make it recursive, we need a procedure for converting natural-quantification formulae into active-quantification formulae. Such a procedure exists by Fact 1.2 above.

Corollary 3.2 (Range-restricted=Safe)

For any o-minimal structure based on a dense order, the class of safe active-semantics queries is the same as the class of range-restricted queries.

Corollary 3.3

For any o-minimal structure based on a dense order (decidable or not), the collection of safe queries is recursively enumerable.

We finish this section with a proposition that follows from the special form of formulae in $\Gamma$, as established in the proof of construction 3.1.

It can be observed that by a modification of construction 3.1, the following is true.

Construction 3.2

Let M be o-minimal and based on a dense order. Let $\phi(\vec{x})$ be a first-order query. Then one can find a set $\Gamma$ of algebraic formulae $\gamma(x; \vec{y})$ such that, for any database D, if $\phi$ [D] is finite, then adom $(\phi[D]) \subseteq \Gamma$ [D].

(c) Example applying technique to polynomial constraints

We now consider the real field, that is, with respect to the constraint language FO+POLY. One task is to find a more concrete representation of range-restricted queries over the real field. Intuitively, it should be sufficient to look for roots of polynomials p $(x; \vec{\alpha})$ where $\vec{\alpha}$ ranges over tuples of elements of the active domain, as suggested by the example in the beginning of this section. However, even quantifier-free algebraic formulae do not give us directly this representation. Nevertheless, in accordance with the present invention, the following can be shown.

Let p $(x; \vec{y})$ be a multivariate polynomial over the real field. Define Root $(p, \vec{\alpha})$ as 0 if $p(x; \vec{\alpha})$ is identically zero, and the set of roots of p $(x; \vec{\alpha})$ otherwise. Given a collection P of olynomials $\{p_1(x, \vec{y}), \ldots, p_m(x, \vec{y})\}$ and a database D, let:

$$P(D) = \bigcup_{i=1}^{m} \bigcup_{\vec{a} \subseteq adom(D)} Root(p_i, \vec{a})$$

Definition 3.2

A query in polynomial range-restricted form is a pair (P, $\phi$), where P is a finite collection of multivariate polynomials, and $\phi(x_1, \ldots, x_n)$ is a FO+POLY query. The semantics is defined as $(P, \phi)$ $[D]=\phi[D] \cap P(D)^n$.

Advantageously, the following proposition states one of the key aspects of the invention that enables the query pre-processor 16 (FIG. 1) to perform the analysis and translation operations explained herein.

Construction 3.3

For every FO+POLY query $\phi$, a collection of polynomials P can be effectively found such that $\phi$ and (P, $\phi$) are equivalent on all databases on which $\phi$ is safe.

This may be achieved in the following manner. Given a query $\phi(\vec{x})$, effectively find a collection of algebraic formulae $\Gamma=\{\gamma_j(x; \vec{y})\}_j$ such that for any D for which $\phi$ is safe, adom $(\phi[D]) \subseteq \Gamma(D)$. For each $\vec{\alpha}$ and each $\gamma \in \Gamma$, the set $\gamma[\vec{\alpha}]=\{c|\ \gamma(c; \vec{\alpha})\}$ is finite, and by o-minimality there is a uniform bound M such that card $(\gamma[\vec{\alpha}]) < M$ for all $\vec{a}$ and $\gamma \in \Gamma$.

Now let $\gamma^i_j(x; \vec{y})$, $i < M$, be defined as follows: $M \vDash \gamma^i_j(c; \vec{\alpha})$ if either: (i) $\gamma_j[\vec{\alpha}]$ has at least i elements, and c is the ith element in the order <; or (ii) $\gamma_j[\vec{a}]$ is nonempty, has fewer than i elements, and c is the largest element of $\gamma_j[\vec{\alpha}]$; or (iii) $\gamma_j[\vec{\alpha}]$ is empty, and c=0. Note that $\gamma^i_j(x; \vec{y})$ s are indeed L $(+, *, 0, 1, <)$ formulae. It is easy to see that each $\gamma^i_j(x; \vec{y})$ defines a function $f_{ij}; \Re^m \to \Re$ where m is the length of $\vec{y}$, by $f_{ij}(\vec{\alpha})=c$ if and only if c is the unique element such that $\gamma^i_j(c; \vec{\alpha})$ holds. Furthermore, this function is semi-algebraic and the following property holds: if $\phi$ is safe for D, then adom $(\phi[D])$ is contained in $\bigcup_{i,j} \bigcup_{\vec{\alpha}} f_{ij}(\vec{\alpha})$, where $\vec{\alpha}$ ranges over adom (D).

It is known that each $f_{ij}(\vec{y})$ is algebraic, that is, there exists a polynomial $p_{ij}(x, \vec{y})$ such that $p_{ij}(x, \vec{y})=0$ if and only if $x=f_{ij}(\vec{y})$. It is easy to see that for $P=\{p_{ij}|i<M, \gamma_j \in \Gamma\}$, $\Gamma(D) \subseteq P(D)$ and P (D) is always finite. To complete the proof, we must show effectiveness. We can effectively construct $\Gamma$, and thus find M (by writing formulae saying that each $\gamma(x; \vec{y})$ has fewer than M satisfiers for each $\vec{y}$, and checking if it is true by applying QE; since it is true for some M, the process terminates). Hence, we can effectively construct $\vec{y}^i_j$s, and the procedure for finding $p_{ij}$ s is effective.

(d) Extensions

Suppose we are given two elementary equivalent structures M and M', for example, $\langle \Re, +, <\rangle$ and $\langle Q, +, <\rangle$. Assuming M is o-minimal based on a dense order, so is M', and thus the characterization of a safe queries applies to M' as well. Thus, it may be proven that if M is an o-minimal structure based on a dense order, and $\phi$ is a safe active-semantics query, then $\phi$ is safe in any structure elementary equivalent to M, i.e., M'.

Given the above-described teachings of the invention, an illustrative scenario is presented below in the context of FIG. 2 whereby a query pre-processor of the invention performs safe translation through range-restriction. It is to be appreciated that the above sections presented the invention in terms of first-order logic, or relational calculus, which is the standard theoretical database query language. Practical languages, and most notable, SQL, are based on relational calculus. The basic form of SQL statements is:

SELECT<attribute list>
FROM<relations list>
WHERE<conditions>

SQL statements roughly correspond to conjunctive queries. For example, the following SQL statement:

SELECT F1·Source, F2·Destination
FROM Flights F1, Flights F2
WHERE F1·Destination=F2·Source selects pairs of cities from the flight database that can be reachable with at most one stopover. An equivalent conjunctive query is:

$\phi(x, y): \exists u$ (Flights(x, u)&Flights(u, y))

To achieve the power of safe first-order logic queries (without constraints), SQL statements are closed under set union, intersection and difference, and results of the queries can be saved for future use.

The present invention shows how SQL design can be extended to deal with constraints. We now illustrate this below using the example shown in FIG. 2

Referring to FIG. 2, a flow diagram is shown of a method of automatic safe query translation in the context of geometric point data according to an illustrative embodiment of the present invention. In step 210, the user 12 enters a query "Unsafe1" at the user interface 14. It is assumed that the spatial database includes a table (relation) "POINTS" which has one non-key attribute "Value," and the relation stores real numbers. To have access to arbitrary real numbers, we assume a hypothetical relation called R with one attribute called X; its elements are all real numbers. Of course it is not stored in a database, but queries are allowed to use this relation. Thus, for example, the query entered by the user may be:

SELECT X1=R·X
X2=POINTS1·Value
X3=POINTS2·Value
FROM R, POINTS POINTS1, POINTS POINTS2
WHERE X1*(X2-1)=X3

It is to be appreciated that query "Unsafe1" is unsafe since if POINTS has values 0 and 1 stored in it, then any real number X1 from R will satisfy the constraint X1*(X2-1)=X3, when X2=1 and X3=0. Thus, the query will have to return all triples (x, 1, 0) where x is an arbitrary real number. Hence, the query is unsafe.

Then, in step 220, the user interface 14 sends the query to the query pre-processor 16 which translates the original query and produces a query "Safe2" by adding a restriction to ensure that a finite result will be sent to engine 18. Thus, query "Safe2" is returned to the user 12 at the user interface 14 as:

SELECT X1=R·X
X2=POINTS1·Value
X3=POINTS2·Value
FROM R, POINTS POINTS1, POINTS POINTS2
WHERE X1*(X2-1)=X3
AND NOT EXISTS
(SELECT Value1=P1·Value, Value2=P2·Value
FROM POINTS P1, POINTS P2
WHERE Value1=1 AND Value2=0)

Then, in step 230 the user queries database engine 18 with "Safe2" via the user interface. The engine returns the appropriate response to the query whereby the response is a finite result.

Advantageously, the query pre-processor effectively forces the original query entered by the user to be safe. This is accomplished by the pre-processor implementing the range-restriction operation, as explained above. The operation effectively finds a set of polynomials that restrict the search range base associated with the engine 18. In other words, the query is modified to direct the engine to search for data in a certain range base. In effect, the polynomials are telling the engine how to increase the range to include the desired result.

To do this, the pre-processor adds one or more restrictions that directs the engine 18 to look only for answers where the polynomials have roots equal to zero. Advantageously, this makes the query result finite since there are only a finite amount of locations where roots of a polynomial are zero.

It is to be appreciated that the pre-processor may add filters even if the query as originally entered is safe. In such case, the filters are merely redundant to the restrictions originally included by the user. In such case, the pre-processor does not affect the result by adding one or more redundant restrictions since the original query would have returned a finite result anyway.

IV. Safe Query Analysis and User-Input Query Restriction

In a second embodiment, the invention provides for taking an input query entered by a user and analyzing it with regard to safety. That is, according to the invention, the user-entered query is analyzed to determine if it has been restricted by a relation. If this is not the case, and therefore the original query is unsafe, then the user is prompted to enter one or more appropriate restrictions. Such analysis is accomplished in accordance with the query pre-processor 16 (FIG. 1). As will be explained and illustrated in the context of FIGS. 3A and 3B, the query pre-processor analyzes a user input query and, if the query is determined to be unsafe, prompts the user to add restrictions or filters to the original query to ensure that the query is of a form that will return only finite results when provided to the spatial database engine 18.

It is to be appreciated that the following is a mathematical explanation of such analysis according to the invention in the context of the notation described in the previous sections. An illustrative scenario will follow this explanation. It is to be further appreciated that, given such detailed explanation of the invention, one of ordinary skill in the art may generate software code for implementing such principles for execution by a query pre-processor.

Safety of arbitrary calculus queries is undecidable even in the pure case, and of course it remains undecidable when interpreted functions are present. As will be explained below, the present invention provides that safety is decidable for Boolean combinations of conjunctive queries in the presence of an interpreted structure such as $\langle \Re, +, 0, 1, < \rangle$. In particular, safety of FO+POLY and FO+LIN conjunctive queries is decidable.

Recall that we are using CQ, UCQ and BCCQ for conjunctive, unions of conjunctive, and Boolean combinations of conjunctive queries (see Section I for their definition in the presence of an interpreted structure). Our proof will be by reduction to the containment problem, which is decidable for UCQs over certain structures. Note that CQs and UCQs are monotone (that is, $D \subseteq D'$ implies $\phi[D] \subseteq \phi[D']$). Since there are non-monotone BCCQs, the class of UCQs is strictly contained in the class of BCCQs.

The main result here is expressed as follows.
Construction 4.1

Let M be o-minimal, based on a dense order, decidable, and admit effective QE. Then it is decidable if a given BCCQ $\phi(\vec{x})$ over M is safe.

The proof is contained in the following sub-constructions. Recall that by containment $\phi \subseteq \psi$ we mean $\phi[D] \subseteq \psi[D]$ for any D.
Sub-construction 4.1

Let M be o-minimal and based on a dense order, and $\phi(\vec{x})$ be a first-order query. Then there exists an active-semantics CQ $\psi(\vec{x})$ such that $\phi$ is safe if and only if $\phi \subseteq \psi$.
Sub-construction 4.2

Let M be as in construction 4.1. Then containment of a BCCQ in a UCQ is decidable; that is, for a BCCQ $\phi(\vec{x})$ and a UCQ $\psi(\vec{x})$ it is decidable if $\phi \subseteq \psi$. This continues to hold if both $\phi$ and $\psi$ are active-semantics queries.

The above two sub-constructions may be achieved as follows. Sub-construction 4.1 follows from construction 3.2: take $\Gamma = \{\gamma_1(x; \vec{y}), \ldots, \gamma_k(x; \vec{y})\}$ given by the proposition; let $\gamma = \bigvee_i \gamma_i$ and let $\psi(x_1, \ldots, x_n)$ be:

$$\exists \vec{y}_1 \in adom \ldots \exists \vec{y}_n \in adom \, \gamma(x_1; \vec{y}_1) \wedge \ldots \wedge (x_n; \vec{y}_n)$$

If $\phi \subseteq \psi$, then $\phi$ is safe since all $\gamma_i$s are algebraic. If $\phi$ is safe, then adom $(\phi[D]) \subseteq \Gamma(D)$ for every D, which implies $\phi \subseteq \psi$.

Sub-construction 4.2 is as follows: Given $\phi$ and $\psi$, one can effectively find a number k such that $\phi \subseteq \psi$ if and only if for every database D with at most k tuples, $\phi[D] \subseteq \psi[D]$.

This clearly implies the result, as the latter condition can be expressed as a $L(\Omega)$ sentence. For example, if the schema contains one relational symbol S, this sentence is $\forall \vec{x}_1 \ldots \vec{x}_k \forall \vec{x} . \phi(\vec{x})[\{\vec{x}_i\}/D] \rightarrow \phi(\vec{x})[\{\vec{x}_i\}/D]$ where $\phi(\vec{x})[\{\vec{x}_i\}/D]$ is obtained from $\phi(\vec{x})$ by replacing each occurrence of $S(\vec{z})$ by $\bigvee_i (\vec{z} = \vec{x}_i)$, and similarly for an arbitrary schema. One can now easily complete the sub-construction using the decidability of M.

Note that every BCCQ a can be represented as $\bigvee i=1^n (X_i(\vec{x}) \wedge \neg \xi_i(\vec{x}))$ where each $X_i$ is CQ and each $\xi_i$ is UCQ; this follows if one writes $\alpha$ as a DNF. We take k to be the maximum length of $X_i$ (measured as the sum of the number of atomic formulae and the number of quantified variables). Assume that $\phi[D]$ is not a subset of $\psi[D]$ for some D; that is, we have a $\vec{\alpha} \in \psi[D]$ is not a subset of $\psi[D]$. Assume D $\vDash X_i(\vec{\alpha}) \wedge \neg \xi_i(\vec{\alpha})$ and let $X_i(\vec{x}) = \exists \vec{y} \exists \vec{z} \in$ adom $\bigwedge j=1^l \alpha_j (\vec{x}, \vec{y}, \vec{z})$. Then, for some $\vec{b}$ over U and $\vec{c}$ over adom (D) we get D $\vDash \bigwedge_{j=1}^l \alpha_j(\vec{\alpha}, \vec{b}, \vec{c})$. Consider those $\alpha_j$s which are SC-formulae. For each such $\alpha_j$, which is of the form $R(\ldots)$ where $R \in SC$, there is a tuple in D that satisfies it. Select one such tuple for each SC-atomic $\alpha_j$, and let D' be D restricted to those tuples. Choose a set of at most length $\vec{c}$ tuples in D contain all the components of $\vec{c}$, and add it to D'. Let the resulting database be D". Clearly, it has at most k tuples.

Note that D" $\vDash \bigwedge_{j=1}^l \alpha_j(\vec{\alpha}, \vec{b}, \vec{c})$ and thus D" $\vDash X_i(\vec{\alpha})$ since $\vec{c} \subseteq$ adom (D"). On the other hand, D" $\vDash \neg \xi_i(\vec{\alpha})$ by monotonicity of $\xi_i$. Thus, we get that $\vec{\alpha} \in \phi[D"] - \psi[D"]$ where D" has at most k tuples. This implies that each counterexample to containment is witnessed by a $\leq$ k-element database, and finishes the proof of correctness of sub-construction 4.2.

To complete construction 4.1, note that under the assumption on M, the CQ $\psi$ such that $\phi \subseteq \psi$ is equivalent to safety of $\phi$ can be effectively constructed—this follows from the procedure for constructing $\Gamma$ given in construction 3.2. The construction can now easily be completed using sub-construction 4.2

Corollary 4.1

It is decidable whether any Boolean combination of FO+LIN or FO+POLY conjunctive queries is safe. Note, however, that safety of CQs is not decidable over every structure. For example, for $\langle N, +, *, 0, 1, < \rangle$, decidability of CQ safety would imply decidability of checking whether a Diophantine equation has finitely many solutions, which is known to be undecidable.

Given the above-described teachings of the invention, an illustrative scenario is presented below in the context of FIGS. 3A and 3B whereby a query pre-processor of the invention performs query analysis and then informs the user whether the original query requires any restrictions or filters to be added in order to make the query safe. We now switch to the SQL syntax again. Recall that the basic SELECT-FROM-WHERE statement corresponds to conjunctive queries, and this remains true in the presence of constraints.

Thus, safety of SELECT-FROM-WHERE SQL queries is decidable, even if one uses polynomial constraints, and has access to the hypothetical relation R that refers to all real numbers.

Figure 3A:
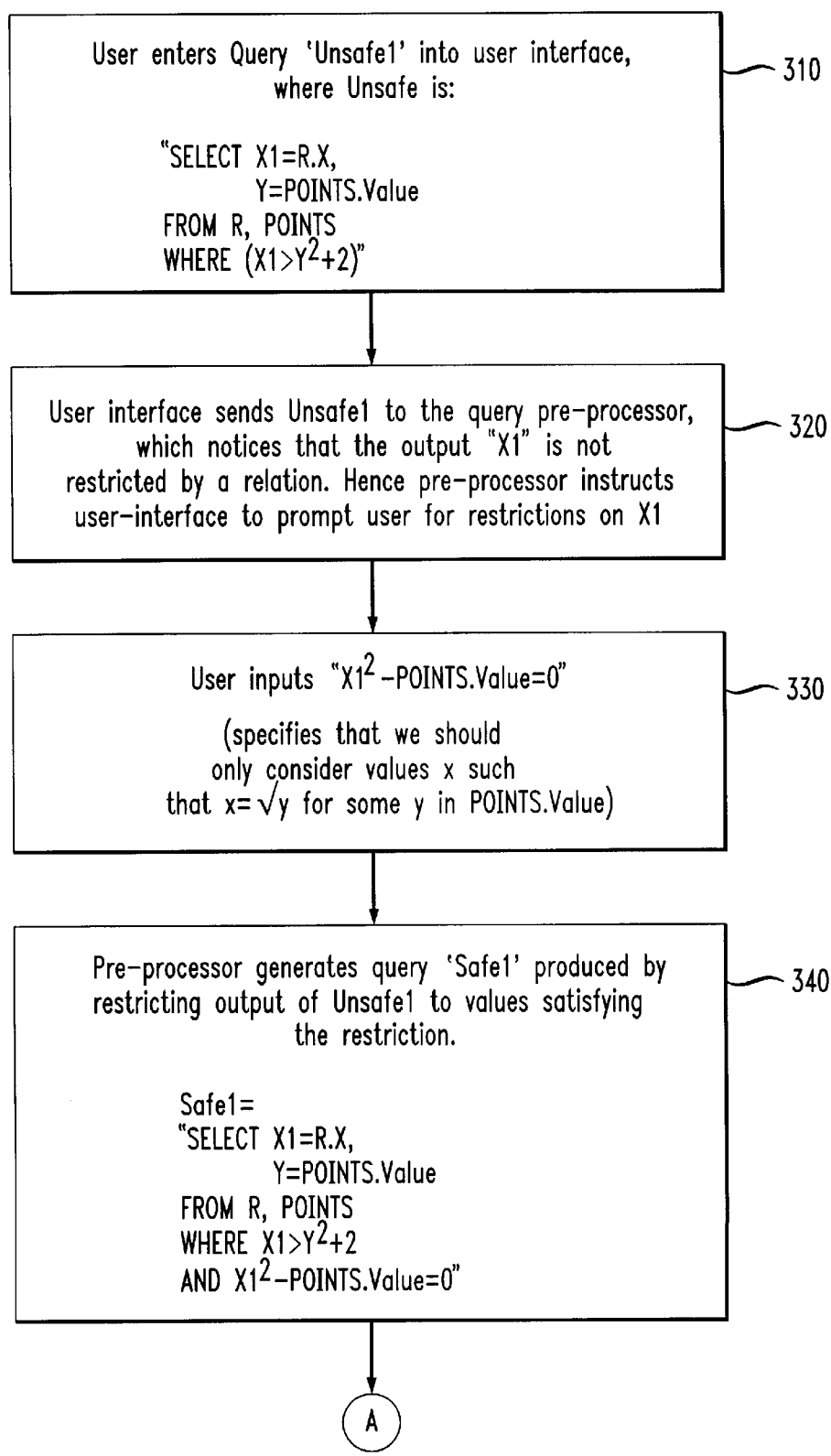
FIGS. 3A and 3B is a flow diagram of a method of safe query analysis and user-input query restriction according to an illustrative embodiment of the present invention.
Figure 3B:
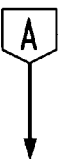

Referring to FIGS. 3A and 3B, a flow diagram is shown of a method of safe query analysis in the context of geometric point data according to an illustrative embodiment of the present invention. In step 310, the user 12 enters a query "Unsafe1" at the user interface 14. For example, the query entered by the user may be:

SELECT X1=R·X
Y=POINTS·Value
FROM R, POINTS
WHERE (X1>Y2+2)

Then, in step 320, the user interface 14 sends the query to the query pre-processor 16 which analyzes the query. According to the invention, the pre-processor determines that the original query is unsafe since it is not restricted by a relation. The pre-processor then instructs the user interface to prompt the user for a restriction on X1.

In step 330, the user inputs "$X1^2$-POINTS·Value=0. In this way, the user specifies that the engine should only consider values x such that $x=\sqrt{y}$ for some y in POINTS·Value. Thus, in step 340, the pre-processor generates query "Safe1" by adding the user-input restriction to the original query. In this way, the pre-processor is effectively restricting the output of the original query to values satisfying the restriction. "Safe1" is as follows:

SELECT X1=R·X
Y=POINTS·Value
FROM R, POINTS
WHERE (X1>Y+2)
AND $X1^2$-POINTS·Value=0

Then, in step 350 the user queries database engine 18 with "Safe1" via the user interface. The engine returns the appropriate response to the query whereby the response is a finite result. An example of a response that may be returned by the engine to the user by at the user interface is shown in block 350.

Advantageously, in this scenario, the query pre-processor analyzes a query entered by the user and tells the user whether or not the query is safe, as explained above. If the query is determined to be unsafe, the user is then prompted to enter one or more restrictions. The pre-processor then generates a new query with the user-input restrictions, assuming the added restriction now makes the query safe. It is to be appreciated that the pre-processor analyzes the query with the restrictions added before declaring it safe.

To do this, the pre-processor determines whether the one or more restrictions will direct the engine 18 to look only for answers where the polynomials have roots equal to zero. Advantageously, this makes the query result finite since there are only a finite amount of locations where roots of a polynomial are zero.

V. Effective Syntax Query Translation Via Preservation of Geometric Properties

In a third embodiment, the invention implements safe query translation where safety has a different meaning then in the previous scenarios and where the data considered is region data rather than point data. Here, finiteness of an output is not at issue, but rather the invention provides a technique for creating a restricted query such that whenever a user-input query includes certain geometric object types, e.g., triangles, the output from the spatial database engine will have the same object types. This is referred to herein as the operation of preserving geometric properties. Such translation is accomplished in accordance with the query pre-processor 16 (FIG. 1). As will be explained and illustrated in the context of FIGS. 4A and 4B, the query pre-processor translates the query to ensure preservation of the same geometric properties in the results returned by the engine.

It is to be appreciated that the following is a mathematical explanation of such translation according to the invention in the context of the notation described in the previous sections. An illustrative scenario will follow this explanation. It is to be further appreciated that, given such detailed explanation of the invention, one of ordinary skill in the art may generate software code for implementing such principles for execution by a query pre-processor.

Accordingly, in this section, we deal with constraint databases that represent potentially infinite objects. The notion of safety over constraint databases is different: we are interested in identifying languages that guarantee preservation of certain geometric properties.

To give a very simple example, assume that spatial objects stored in a database are convex polytopes in $\Re^n$. A simple query "return the convex hull of all the vertices x with $\|x\|<1$" does always return a convex polytope. This query must be written in a rather expressive language: it can be expressed in FO+POLY but not FO+LIN. Now, our question is: can we ensure in some way that a class of FO+POLY programs preserves a given property, like being a convex polytope? That is, can we find an effective syntax for the class of queries that preserve certain geometric properties? In accordance with the invention, the answer to these questions is yes.

First, we present a general scheme for enumerating such queries in FO(M). Here M is some structure on the reals, not necessarily $\langle \Re, +, *, 0,1, <\rangle$. The approach is based on reduction to the finite case, and using our results about finite query safety.

We explain the invention for three geometric properties: (i) a convex polytope; (ii) a convex polyhedron; and (iii) a compact semi-linear set in $\Re^2$ (the latter are perhaps the most often encountered class of constraint databases).

We then demonstrate that for unions of conjunctive FO+POLY queries, it is decidable whether they preserve convex polytopes or compact semi-linear sets in $\Re^2$.

To define a general framework for explaining queries that preserve geometric properties, we recall some basic definitions on constraint (or finitely representable) databases. As before, we have a language of some underlying structure M and a schema SC, but now m-relations in SC are given by quantifier-free formulae $\alpha(x_1, \ldots x_m m)$ in L ($\Omega$). It is to be appreciated that we do not assume relational attributes for the sake of ease of notation. If M is $\langle \Re, +, 0,1, <\rangle$, then sets so defined are called semi-linear; for $\langle \Re, +, *, 0,1, <\rangle$ they are called semi-algebraic. The query languages for constraint databases are the same as those we considered for finite ones: FO (SC, $\Omega$).

If $M=\langle U, \Omega\rangle$ is an infinite structure, let Obj($\Omega$) be the class of finitely representable databases over M, that is, Obj($\Omega$)=$\bigcup_{n<w}$Obj$_n$($\Omega$) and Obj$_n$($\Omega$) is the collection of subsets of $U^n$ of the form $\{(x_1, \ldots, x_n)|M \vDash \alpha(x_1, \ldots, x_n)\}$ where $\alpha$ is quantifier-free first-order formula in L ($\Omega$). We use SAlg$_n$ for semi-algebraic sets.

Let S be an m-ary relational symbol, and let $\psi(y_1, \ldots, y_n)$ be a first-order formula in the language of S and $\Omega$. Then this query defines a map from Obj$_m$($\Omega$) to Obj$_n$($\Omega$) as follows: for any $X \in$ Obj$_m$($\Omega$), $\psi[X]=\{\vec{y} \mid (M, X) \vDash \psi(\vec{y})\}$. Clearly $\psi[X] \in$ Obj($\Omega$), if M has quantifier-elimination.

Let C be a class of objects in Obj($\Omega$). We say that a first-order query $\psi$ preserves C if for any $X \in$C, $\psi[X] \in$ C. For example, C can be the class of convex polytopes in SAlg.

Thus, the safety question for constraint databases is the following. Is there an effective syntax for the class of C-preserving queries? Below, we show a solution.

Definition 5.1

The class C has a canonical representation in Obj($\Omega$) if there is a recursive infective function g: N→N with computable inverse, and for each n, two functions code$_n$: $2^{U^n} \to 2^{U^m}$ and decode$_n$: $2^{U^m} \to 2^{U^n}$, where m=g(n), such that:

(1) decode$_n$° code$_n$ (x)=x if x $\in$ Obj$_n$($\Omega$);

(2) code$_n$ (x) is finite if x $\in$ C; decode$_n$(x) $\in$ C if x is finite;

(3) code$_n$ is FO($\Omega$)-definable on Obj$_n$($\Omega$);

(4) decode$_n$ is FO($\Omega$)-definable on finite sets.

Intuitively, the canonical representation is a finite representation of C within Obj($\Omega$) that can be defined in first-order logic over M. For example, an approach to obtaining a canonical representation of convex polytopes would be to compute their vertices. This suffices to reconstruct the polytope, and the vertices can be defined by a first-order formula. The actual representation proposition 5.1 below) is indeed based on computing the vertices.

Next we show that canonical representations solve the safety problem. We always assume that the set $\Omega$ is recursive.

Construction 5.1

Let $M=\langle U, \Omega\rangle$ be o-minimal, based on a dense order, decidable, and have effective QE. Suppose C is a class that has a canonical representation in Obj($\Omega$). Then there is an effective syntax for C-preserving FO($\Omega$) queries; that is, there exists a recursively enumerable set of FO($\Omega$) queries that express exactly all C-preserving FO($\Omega$) queries.

This may be achieved in the following manner. Consider an enumeration of all safe FO($\Omega$) queries $\langle\phi_i\rangle$ (from Corollary 3.2 we know that it exists). Let $\phi$ use the extra relation symbol of arity m, and assume that n is such that g(n)=m; given the assumptions, we can compute that. Let $\phi$ have l parameters, and again let k be such that g(k)=l. If n and k are found for a given $\phi_i$, we let $\psi$ be:

$$\text{decode}_k° \phi_i° \text{code}_n$$

This produces the required enumeration. So we have to check that every query above preserves C, and for every C-preserving $\psi$ we can get $\phi$ such that decode $°$ $\phi°$ code coincides with $\psi$. The first one is clear: if we have $X \in$ C, then code$_n$(X) is finite, hence $\phi_i$[code$_n$(X)] is finite too, and applying decode$_k$ we get an object in C.

For the converse, suppose we have a C-preserving query $\psi$: Obj$_n$($\Omega$)→Obj$_k$($\Omega$). Define $\alpha$ as follows: $\alpha$=code$_k$ ° $\psi°$ decode$_n$. That is, $\alpha$ is a query Obj$_m$ ($\Omega$)→Obj$_l$($\Omega$). Given this, notice that:

$$\text{decode}_k ° \alpha° \text{code}_n=\text{decode}_k ° \text{code}_k° \psi° \text{decode}_n ° \text{code}_n=\psi$$

on Obj$_n$($\Omega$). Thus, it remains to show that $\alpha$ is safe, i.e., preserves finiteness. Let X be a finite set in $U^m$. Then decode$_n$(X) $\in$ C, decode$_n$(X) $\subset$ C. Since $\psi$ is C-preserving, we get that Y=$\psi$[decode$_n$(X)] $\in$ Obj$_k$($\Omega$) is in C, too, and thus $\text{code}_k(Y)$ is finite. This proves finiteness of $\alpha$, and concludes the proof of correctness of the construction.

We now turn to examples in the case when $\Omega = \{+, *, 0, 1, <\}$; that is, we are looking for canonical representations in SAlg. Let CPH be the class of convex polyhedra (i.e., intersections of a finite number of closed halfspaces) and CPT be the class of convex polytopes (i.e., bounded polyhedra). The basic facts on convex sets that will be used in the proofs of the propositions below are known in the art, e.g., R. T. Rockafellar, "Convex Analysis," Princeton Univ. Press, 1970.

Proposition 5.1

The class CPT has canonical representation in SAlg. This may be proven as follows. Given a convex polytope X in $\Re^n$, its vertices can be found as $V(X) = \{\vec{x} \in \Re^n \mid \vec{x} \in X \cdot \vec{x} \notin \text{conv}(X - \vec{x})\}$. Thus, vertices of convex polytopes are definable in FO $(+, *, 0, 1, <)$, because the convex hull of a finite set of points is definable, and, in view of Caratheodory's theorem, we have:

$$V(X) = \{\vec{x} \in \Re^n \mid \vec{x} \in X, \forall \vec{x}_1, \ldots, \vec{x}_{n+1} \in X - \vec{x} \cdot \vec{x} \notin \text{conv}(\{\vec{x}_1, \ldots, \vec{x}_{n+1}\})\}$$

We now define $\text{code}_n$. To simplify the notation, we let it produce a pair of n-ary relations, but it can be coded in a straightforward manner by one relation. If $X = \text{conv}(V(X))$, then $\text{code}_n(X) = (V(A), 0)$; otherwise, $\text{code}_n(X) = (\Re^n, X)$. The function $\text{decode}_n : 2^{R^n} \times 2^{R^n} \to 2^{R^n}$ is defined as follows:

$$\text{decode}_n(Y, Z) = \begin{cases} \bigcup_{(\vec{y}_1, \ldots, \vec{y}_{n+1}) \in Y} \text{conv}(\{\vec{y}_1, \ldots, \vec{y}_{n+1}\}) & \text{if } Y \neq R^n \\ Z & \text{otherwise,} \end{cases}$$

Clearly, $\text{decode}_n \circ \text{code}_n$ is the identity function for any (semi-algebraic) set; these functions are also first order definable. If X is a polytope, $V(X)$ is finite, and by Caratheodory's theorem each point of X is contained in the convex hull of most n+1 vertices of X. Hence, card $(\text{code}_n(X)) \leq \text{card}(V(X))^{n+1}$, which is finite. If $(Y, Z)$ is finite, then $\text{decode}_n(Y)$ is $\text{conv}(Y)$, and thus a convex polytope. This proves the proposition.

Proposition 5.2

The class CPH has canonical representation in SAlg. This may be proven as follows. Let X be a convex polyhedron in $\Re^n$. Then $X = L + (X \cap L^\perp)$, where L is its lineality space, defined as $\{\vec{y} \mid \forall \vec{x} \in S \cdot \vec{y} + \vec{x} \in X\}$ (it is a subspace of $\Re^n$) and $L^\perp$ is the orthogonal subspace $\{\vec{y} \mid \forall \vec{x} \in L \cdot (\vec{x}, \vec{y}) = 0\}$. We shall use $X_0$ for $X \cap L^\perp$ in this proof. It is known that $X_0$ is a convex polyhedron of lineality zero, that is, it contains no line. By A+B we mean $\{\vec{a} + \vec{b} \mid \vec{a} \in A, \vec{b} \in B\}$. Note the difference between the translate $X - \vec{x} = \{\vec{y} - \vec{x} \mid \vec{y} \in X\}$ and the set-theoretic difference X−x; we use $\vec{x}$ to distinguish between them.

For $X_0$, define its vertices as $x \in X_0$ such that $x \notin \text{conv}(X_0 - x)$. A direction is given by a vector $\vec{y}$ and corresponds to the equivalence class of rays which are translate of each other. Note that each direction can be canonically represented by $\vec{y}$ such that $\|\vec{y}\| = 1$. A direction $\vec{y}$ is an extreme direction of $X_0$ if for some vertex $\vec{x}$, the ray through $\vec{x}$ in the direction of $\vec{y}$, $l(\vec{x}, \vec{y}) = \{\vec{x} + \lambda \cdot \vec{y} \mid \lambda \geq 0\}$, is a face of $X_0$. Since $X_0$ is polyhedral of lineality zero, the set of vertices and extreme directions is finite. By (generalized) Caratheodory's theorem, every point $\vec{z}$ of $X_0$ is a combination of at most n+1 vertices and extreme directions, $$\lambda_1 \vec{x}_1 + \ldots + \lambda_k \vec{x}_k + \mu_1 \vec{y}_1 + \ldots + \mu_m \vec{y}_m, \text{ where } \lambda_i, \mu_j \geq 0, \lambda_1 + \ldots + \lambda_k = 1, k + m \leq n + 1.$$

This suggests the following coding scheme. As before, for simplicity of exposition, we assume several coding relations, but they can be combined into one easily. It is to be understood that, in accordance with the mathematical definitions, all the concepts we use are first-order definable over the real field. We use relations $\text{LINEAL}_k$; each such relation contains a canonical representation (roughly, an orthogonal basis) of the lineality space of X, provided its dimension is k. That is, at most one of these relations actually contains some information. We then have the relations Vert and ExtDir for storing vertices and extreme directions of $X_0$. Finally, we have a relation Points that contains points that do not belong to $L + X_0$ (recall that the coding scheme applies to any semi-algebraic set, so there could be such points, and we need to record them for the decode function).

Thus, to code (an arbitrary semi-algebraic) set X, we first note that its lineality space $L(X) = \{\vec{y} \mid \forall \vec{x} \in X \cdot \vec{x} + \vec{y} \in X\}$ and its orthogonal $L(X)^{\perp} = \{\vec{y} \mid \forall \vec{x} \in L(X) \cdot (\vec{x}, \vec{y}) = 0\}$ are definable in FO+POLY (note that one can define the inner product in FO+POLY). Furthermore, for each $k \leq n$, there exists a FO+POLY sentence $\dim_k$ expressing the fact that $L(A)$ is a subspace of $\Re^n$ and its dimension is k. This is true because in FO+POLY we can test linear independence; thus, we can check if there exists a system of k linearly independent vectors in L such that every vector in L is a linear combination of them.

Next, we show how to compute $\text{LINEAL}_k$ and VertDir. We first sketch the coding scheme for $\text{LINEAL}_k$. The set $L(X)$ is FO+POLY-definable. Assume that it is a k-dimensional linear space (which is tested by $\dim_k$). Let $\Delta_n$ be some canonically chosen n-dimensional simplex of diameter 1 such that the origin has barycentric coordinates $$\left(\frac{1}{n}, \ldots, \frac{1}{n}\right).$$

Consider intersection of $L(X)$ with 1-dimensional faces of $\Delta_n$ (unless $L(X)$ is a line, in which case we consider its intersection with 2-dimensional faces of $\Delta_n$). If the intersection is a point, we record that point; if it contains the whole face, we record both endpoints of the face. From the selected points, find a linearly independent subsystem (note that it can be done canonically, for example, by listing the vertices and 1-dimensional faces of $\Delta_n$ in some order). It then serves as a basis of $L(X)$, which we use to code $L(X)$. Note that $L(X)$ can be reconstructed in FO+POLY from its basis.

Now that we have a representation for the lineal space of X, and a first-order formula defining $L^\perp$, we have a FO+POLY-formula defining $X_0$. Using it, we can compute vertices:

$$V(X_0) = \{x \in X_0 \mid \exists x_1, \ldots, x_{n+1} \in X_0 - x \cdot x \in \text{conv}(\{x_1, \ldots, x_{n+1}\})\}.$$

Clearly, this is a first-order definition. Next, we find the set:

$$E(X_0) = \{\vec{y} \mid (\vec{y}, \vec{y}) = 1 \text{ and } \exists \vec{x} \in V(X_0) \cdot 1(\vec{x}, \vec{y}) \text{ is a face}\}.$$

A subset Y of $X_0$ is a face if every closed line segment in $X_0$ with a relative interior point in Y has both endpoints in Y. Clearly, this is first-order definable, and thus $E(X_0)$, the set of extreme directions of $X_0$, is first-order definable.

Given two sets V and E in $\mathfrak{R}^n$, by conv (V, E) we denote their convex hull, that is, the set of elements of $\mathfrak{R}^n$ definable as $$\sum_{i=1}^{k} \lambda_i \cdot \vec{x}_i + \sum_{j=1}^{m} \mu_j \cdot \vec{y}_j, \text{ where}$$

$$\vec{x}_i \in V, \vec{y}_j \in E, \sum_{i=1}^{k} \lambda_i = 1, \lambda_i, \mu_j \geq 0 \text{ and } k+m \leq n+1.$$

Again, this can be done in FO+POLY.

We now describe $code_n$. For a semi-algebraic set X, it produces a tuple of relations:

$(LINEAL_0, \ldots, LINEAL_n, Vert, ExtDir, Point)$ as follows. It first determines, by computing $L(X)$, $L(X)^\perp$, $V(X_0)$ and $E(X_0)$ if it is the case that $L(X)$ is a linear subspace of $\mathfrak{R}^n$ and:

$X = L(X) + conv(V(X_0), E(X_0)).$

If this is the case, then $LINEAL_k$, Vert, and ExtDir are produced as before, and Point is empty. Otherwise, Point coincides with X, and all other sets in the coding are taken to be $\mathfrak{R}^n$. From the description above it follows that $code_n$ is FO+POLY-definable.

To compute $decode_n$, we first check if the first n+2 relations in the code coincide with $\mathfrak{R}^n$, and, if this is the case, output the last relation in the code. Otherwise, we use the nonempty $LINEAL_k$ with least k to compute a linear subspace L of $\mathfrak{R}^n$ generated by the vectors in $LINEAL_k$ (if all $LINEAL_k$ are empty, we let this subspace be $\{\vec{0}\}$)). Next, compute Y=conv(Vert, ExtDir). Note that both are FO+POLY-definable. Finally, return L+Y $\cap L^\perp$; this is FO+POLY-definable also. This completes the proof Let SLincomp be the class of compact (i.e., closed and bounded) semi-linear sets. We resolve this case for dimension 2, that is, for non-convex two dimensional polygons.

Proposition 5.3

The class $SLinComp_2$ has canonical representation in $SAlg_2$. This may be proven as follows. An object in $SLinComp_2$ is a finite union of convex polytopes in $\mathfrak{R}^2$—this easily follows from cell decomposition. Any such object X admits a triangulation that does not introduce new vertices. Thus, the idea of the coding is to find the set V(X) of vertices and use as the code triples of vertices (not necessarily distinct) $(\vec{x}, \vec{y}, \vec{z})$ with $conv(\{\vec{x}, \vec{y}, \vec{z}\}) \subseteq X$. More precisely, a triple $(\vec{x}, \vec{y}, \vec{z})$ belongs to code(X) if either $\vec{x}, \vec{y}, \vec{z} \in V(X)$ and $conv(\vec{x}, \vec{y}, \vec{z}) \subseteq X$, or $\vec{x} = \vec{y} = \vec{z}$ and there is no triple of elements of V(X) whose convex hull is contained in X and contains $\vec{x}$. Thus code(X) $\subseteq \mathfrak{R}^6$. For decode, we use:

$$decode(Y) = \bigcup_{(\vec{x}, \vec{y}, \vec{z}) \in Y} conv(\{\vec{x}, \vec{y}, \vec{z}\}).$$

Clearly, decode $\circ$ code is the identity, decode is first-order definable, and decode(Y) is compact and semi-linear when Y is finite. Thus, it remains to show that Y(X) is finite and FO+POLY-definable. The former is well-known. For the first-order definition of V(X) we use the following result. Let X be a finite union of polyhedra (in $\mathfrak{R}^n$) and let $B_\in(\vec{x})$ be the ball of radius $\in$ around z. Then for each $\vec{x}$, there exists $\delta > 0$ such that for any $0 < \in_1, \in_2 < \delta$, we have:

$$\vec{x} + \bigcup_{\lambda > 0} \lambda \cdot [(X \cap B_{\in_1}(\vec{x})) - \vec{x}] = \vec{x} + \bigcup_{\lambda > 0} \lambda \cdot [(X \cap B_{\in_2}(\vec{x})) - \vec{x}]$$

We denote this set by $X(\vec{x})$. Define the equivalence relation $\equiv_x$ by $\vec{y} \equiv_x \vec{z}$ if $X(\vec{y}) = X(\vec{z})$. Then the vertices of X are precisely the one element equivalence classes of $\equiv_x$. It is routine to verify that the above can be translated into a FO+POLY definition of vertices. This completes the proof.

Summing up, we have:

Theorem 5.1

There exists a recursively enumerable class of FO+POLY queries that captures the class of CPT (CPH and $SLinComp_2$, respectively) preserving queries.

Given the above-described teachings of the invention, an illustrative scenario is presented below in the context of FIGS. 4A and 4B whereby a query pre-processor of the invention performs query translation by providing an effective syntax query in response to a user-input query including certain geometric objects. The effective syntax query ensures that the same geometric properties associated with the objects in the original query are preserved in the results returned by the engine. In the following example, we show, using SQL syntax, how a user forms a query that preserves the property of being a union of triangles. Such a query would first compute vertices of its input, thereby creating a finite relation with six attributes (each vertex of a triangle is a point on the real plane and is thus described by two real numbers). The user then applies a query that was shown to be safe b the pre-processor and obtains another relation with six attributes. This relation is treated as coding of the output: each tuple describes a triangle in the output. Since there are finitely many six-tuples, the result of the query is a finite union of triangle. Below, we describe a safe query on finite relations with six attributes first, and then apply it to a geometric relation.

Figure 4B:
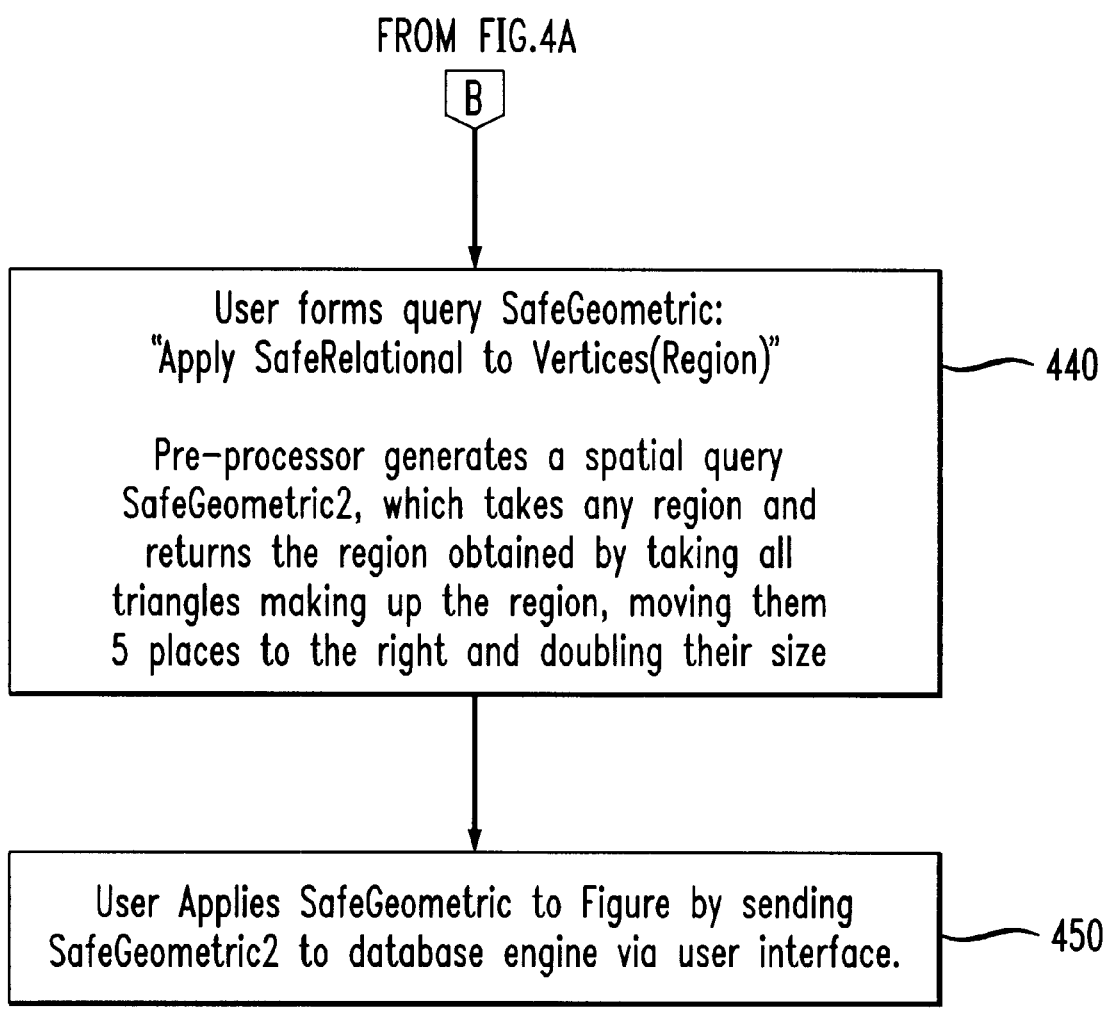

Referring to FIGS. 4A and 4B, a flow diagram is shown of a method of effective syntax query translation in the context of geometric region data according to an illustrative embodiment of the present invention. In step 410, the user 12 enters a query "SafeRelational" at the user interface 14. The query applies to a database schema with input table VERT, which is a finite relational table with 6 attributes: v1xval, v1yval, v2xval, v2yval, v3xval and v3yval. It is to be appreciated that "SafeRelational" outputs a table with six columns as well. In this example, the query "SafeRelational" entered by the user may be:

SELECT U1=R·X,
U2=R·X,
V2=R4·X,

W1=R5·X,
W2=R6·X,
FROM R R1, R R2, R R3, R R4, R R5, R R6, VERT
WHERE U1=VERT·v1xval+5 AND
U2=VERT·v1yval*2 AND
V1=VERT·v2xval+5 AND
V2=VERT·v2yval*2 AND
W1=VERT·v3xval+5 AND
W2=VERT·v3yval*2

In step 420, the user interface 14 sends the query to the query pre-processor 16 which accepts the query since it requires no modification to be made safe. In step 430, the user creates a schema Figure of type region (e.g., stores triangular regions in the a plane) and inputs some sample data. The user then, in step 440, forms query "SafeGeometric: Apply SafeRelational to Vertices(Regions)".

In response, the query pre-processor generates a spatial query "SafeGeometric2," which takes any region and returns the region obtained by taking all triangles making up the region, moving them 5 places to the right, and doubling their size. The user then, in step 450, applies "Safegeometric" to the schema Figure by sending "SafeGeometric2" to the database engine via the user interface.

Advantageously, in this scenario, the query pre-processor generates an effective syntax query (SafeGeometric2) that ensures that the geometric properties associated with the user's original query are preserved in the output returned by the spatial database engine.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in a database system, the method comprising the steps of:
    obtaining an original query entered by a user; and
    pre-processing the original query before submittal to a database engine associated with the database system wherein a result of the pre-processing operation is to ensure that the pre-processed query provided to the engine is safe:
    wherein the original query is a conjunctive query and the pre-processing step includes analyzing the original conjunctive query to determine if the original conjunctive query would return finite results from the database, and prompting the user to restrict the original conjunctive query, if the original query would not return finite results, by inserting at least one range-restriction in the original query, the range-restriction specifying an upper bound on the results to be returned by the database as a set of roots of polynomials with coefficients coming from an active domain of the database and a finite set of constants.

2. The method of claim 1, wherein the database contains spatial data.

3. The method of claim 1, wherein the pre-processed query supports first-order logic and one or more polynomial constraints.

4. The method of claim 1, wherein the pre-processed query supports first-order logic and one or more linear constraints.

5. Apparatus for use in a database system, the apparatus comprising:
    at least one processor operative to obtain an original query entered by a user, and to pre-process the original query before submittal to a database engine associated with the database system wherein a result of the pre-processing operation is to ensure that the pre-processed query provided to the engine is safe wherein the original query is a conjunctive query and the pre-processing operation includes analyzing the original conjunctive query to determine if the original conjunctive query would return finite results from the database, and prompting the user to restrict the original conjunctive query, if the original query would not return finite results, by inserting at least one range-restriction in the original query, the range-restriction specifying an upper bound on the results to be returned by the database as a set of roots of polynomials with coefficients coming from an active domain of the database and a finite set of constants.

6. The apparatus of claim 5, wherein the database contains spatial data.

7. The apparatus of claim 5, wherein the pre-processed query supports first order logic and one or more polynomial constraints.

8. The apparatus of claim 5, wherein the preprocessed query supports first-order logic and one or more linear constraints.

9. An article of manufacture for use in a database system, comprising a machine readable medium containing one or more programs which when executed implement the steps of:
    obtaining an original query entered by a user; and
    pre-processing the original query before submittal to a database engine associated with the database system wherein a result of the pre-processing operation is to ensure that the pre-processed query provided to the engine is safe;
    wherein the original query is a conjunctive query and the pre-processing step includes analyzing the original conjunctive query to determine if the original conjunctive query would return finite results from the database, and prompting the user to restrict the original conjunctive query, if the original query would not return finite results, by inserting at least one range-restriction in the original query, the range-restriction specifying an upper bound on the results to be returned by the database as a set of roots of polynomials with coefficients coming from an active domain of the database and a finite set of constants.

* * * * *